Patented Sept. 23, 1930

1,776,694

UNITED STATES PATENT OFFICE

EMIL LÜSCHER, OF BASEL, SWITZERLAND, ASSIGNOR TO LONZA ELEKTRIZITATSWERKE UND CHEMISCHE FABRIKEN AKTIENGESELLSCHAFT, OF BASEL, SWITZERLAND

MANUFACTURE OF DOUBLE SALTS OF CALCIUM NITRATE

No Drawing. Application filed November 14, 1929, Serial No. 407,287, and in Germany December 31, 1928.

It has been found that double salts of calcium nitrate which are well defined chemically and physically are obtained if additional nitrate having a monovalent kathion, for example lithium nitrate, sodium nitrate, potassium nitrate, rubidium nitrate, caesium nitrate, ammonium nitrate or thallium nitrate is added to a hot solution of calcium nitrate containing at least 65% of anhydrous calcium nitrate, in such quantity that the ratio of calcium nitrate to the added nitrate with the monovalent kathion is about 5:1.

For preparing such double salts advantageously a hot concentrated calcium nitrate solution containing about 78% of calcium nitrate is used. Preferably such a quantity of the desired additional nitrate, e. g. potassium nitrate is added to this solution that 1 molecule of the added nitrate is present in the solution to every 5 molecules of calcium nitrate. Upon cooling, well defined crystals are formed which can easily be separated from the mother liquor by filtration or centrifuging. The mother liquor after suitable concentration can be used for preparing further quantities of double salts. The solid products appear to consist of complex compounds having the following general formula:

$$5Ca(NO_3)2.Me\ NO_3.10H_2O$$

Me in the formula standing for Li, Na, K, Rb, Cs, $NH_4$, or Tl. The completely similar crystal structure of the salts alone shows that the compounds are similar.

If a hot 82% calcium nitrate solution is used then after addition of a quantity corresponding to the above formula of the nitrate having a monovalent kathion, a crystal mass is directly obtained upon cooling which consists almost entirely of one of the above mentioned double salts.

However a more dilute solution of calcium nitrate provided it contains at least 65% of calcium nitrate, can be used for preparing the double salts. In this case the yield of double salt is correspondingly lower, as to all appearances the formation thereof depends on the presence of calcium nitrate-dihydrate.

More or less than the theoretically correct quantity of $MeNO_3$ can be added, the same salt being nevertheless obtained. If less than the theoretical quantity of $MeNO_3$ is used the yield of double salt falls. If on the other hand a solution containing more than 82% of calcium nitrate is used, the separated double salt still contains a corresponding amount of solid anhydrous calcium nitrate.

Of the double salts prepared as described, those containing potassium and ammonium have proved excellent as manures, especially since they can be prepared with extraordinarily uniform crystal size and owing to the almost spherical form of the crystals, show little tendency to cake together. By slight subsequent drying, caking can be avoided to an extent hardly attainable in any usual commercially obtainable nitrogenous manure. Both the said substances are suitable for manual or mechanical distribution.

When the crystals are suitably completely freed of water they remain intact and surprisingly lose little or none of their original hardness. Such products have the advantage of a relatively high nitrogen content. The corresponding ammonium salt for example contains about 18.6% of nitrogen.

Instead of the described additional nitrates, other suitable salts can be used, that is such salts as with calcium nitrate form nitrates of the above mentioned monovalent kathions, for example potassium chloride instead of potassium nitrate.

What I claim is:—

1. A process for preparing double salts of calcium nitrate, consisting in adding to a hot solution of calcium nitrate containing at least 65% of anhydrous calcium nitrate an additional salt of a monovalent kathion of such a nature and quantity that the reaction product contains calcium nitrate and additional nitrate of said monovalent kathion in an approximate ratio of 5:1.

2. A process for preparing double salts of calcium nitrate, consisting in adding to a hot solution of calcium nitrate containing at least 65% of anhydrous calcium nitrate an additional nitrate of a monovalent kathion in such a quantity that the ratio of calcium nitrate to the added nitrate is about 5:1.

3. A process for preparing double salts of calcium nitrate, consisting in adding to a hot solution of calcium nitrate containing at least 65% of anhydrous calcium nitrate an additional nitrate of a monovalent kathion in such a quantity that the ratio of calcium nitrate to the added nitrate is about 5:1, and in finally dehydrating the double salt formed to prevent caking.

4. A process for preparing double salts of calcium nitrate, consisting in adding to a hot solution of calcium nitrate containing at least 65% of anhydrous calcium nitrate such a quantity of additional ammonium nitrate that the ratio of calcium nitrate to ammonium nitrate is about 5:1.

5. A process for preparing double salts of calcium nitrate, consisting in adding to a hot solution of calcium nitrate containing at least 65% of anhydrous calcium nitrate such a quantity of additional potassium nitrate that the ratio of calcium nitrate to potassium nitrate is about 5:1.

6. As new articles of manufacture, the new double salts of calcium nitrate obtained by adding to a hot solution of calcium nitrate containing at least 65% of anhydrous calcium nitrate such a quantity of additional ammonium nitrate that the ratio of calcium nitrate to ammonium nitrate is about 5:1, said salts constituting an easily spreadable manure.

7. As new articles of manufacture, the new double salts of calcium nitrate obtained by adding to a hot solution of calcium nitrate containing at least 65% of anhydrous calcium nitrate such a quantity of additional potassium nitrate that the ratio of calcium nitrate to potassium nitrate is about 5:1, said salts constituting an easily spreadable manure.

8. As new articles of manufacture, the new double salts of calcium nitrate obtained by adding to a hot solution of calcium nitrate containing at least 65% of anhydrous calcium nitrate such a quantity of an additional nitrate of a monovalent kathion that the ratio of calcium nitrate to the added nitrate is about 5:1, said salts constituting well defined crystals.

In witness whereof I have hereunto signed my name this 24th day of October, 1929.

EMIL LÜSCHER.